Dec. 7, 1948.  M. RONNING ET AL  2,455,906
CROP GATHERING MECHANISM FOR COMBINES
Filed Dec. 31, 1943  2 Sheets-Sheet 1

Inventors
MARTIN RONNING
KENNETH M. KEITH
By Carlsen + Hagle
Attorneys

Dec. 7, 1948.  M. RONNING ET AL  2,455,906
CROP GATHERING MECHANISM FOR COMBINES
Filed Dec. 31, 1943  2 Sheets-Sheet 2

Inventors
MARTIN RONNING
KENNETH M. KEITH

By Carlsen + Hagle
Attorneys

Patented Dec. 7, 1948

2,455,906

UNITED STATES PATENT OFFICE 2,455,906

CROP GATHERING MECHANISM FOR COMBINES

Martin Ronning, St. Louis Park, and Kenneth M. Keith, Minneapolis, Minn., assignors to Minneapolis-Moline Power Implement Company, Minneapolis, Minn., a corporation of Delaware Application December 31, 1943, Serial No. 516,563

10 Claims. (Cl. 56—364)

This invention relates generally to improvements in combines of the harvester-thresher type and more particularly to a mechanism for such machines for gathering and feeding the grain to the machine.

The usual combine includes harvesting and threshing parts which cut the grain and thresh it as the machine advances over the field, depositing the cleaned threshed grain in a tank on the combine and returning the straw and chaff to the field. However under certain well known circumstances it is found expedient to first cut the grain and arrange it in windrows in the field before it is threshed.

Our present invention has as its primary object the provision of a mechanism by which the windrowed crop may be expeditiously gathered from the field and fed to the threshing mechanism of a combine. Another object is to provide gathering mechanism for windrowed crops which may be readily applied to the usual combine to replace the harvesting cutter of the machine so that the one machine, with comparatively few auxiliary parts, may be used in connection with any crop conditions. Still another object is to provide mechanism of this nature by which the feeding operation on the gathered crop is facilitated and rendered fast and positive, so that all of the crop from a relatively wide windrow may be gathered and evenly fed onto the comparatively narrow conveyor, which such machines are provided with, for carrying the crop to the threshing mechanism.

These and other more detailed and specific objects will be disclosed in the course of the following specification, reference being had to the accompanying drawings, in which—

Figure 1:
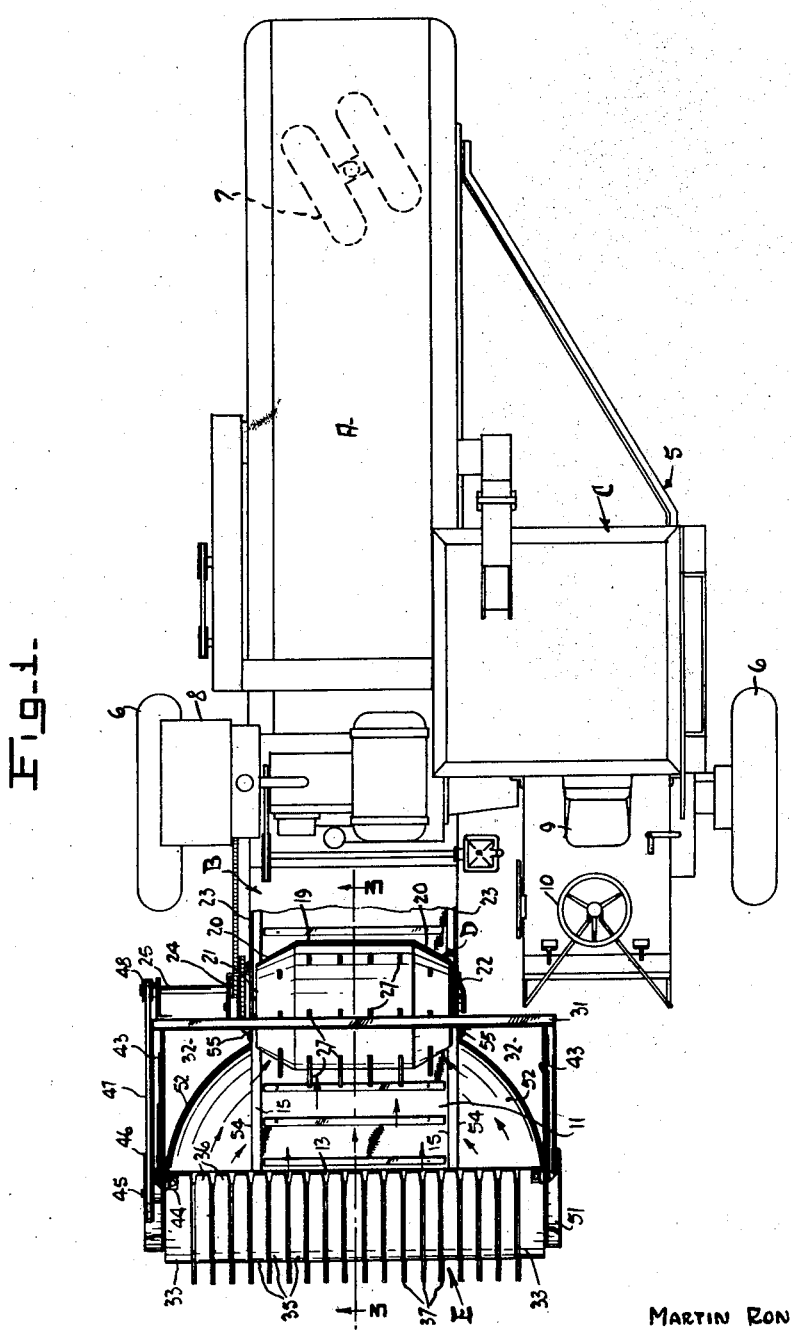
Fig. 1 is a plan view of a combine provided with our improved crop gathering and feeding mechanism.

Referring now more particularly and by reference characters to the drawings, 5 designates the main frame of the machine, the same being supported by widely spaced forward traction wheels 6 and by a rearwardly located steering truck 7. An engine 8 provides power both for propelling the wheels 6 and for operating the various gathering, feeding and threshing mechanism and this engine and said mechanisms are controlled from an operator's station 9. The machine is also steered from the station 9 by means of a steering wheel 10 and appropriate connections.

The combine proper includes a thresher part A to which the crop material is delivered through a feeder housing B, and which part threshes the crop, delivering the grain to a tank C and dropping the straw and chaff back to the field at the rear end of the thresher. Ordinarily the combine also includes a harvester part having a widespread platform section, extending laterally from each side of the forward end of the housing B, and a cutter or sickle bar along the forward edge of the platform to cut the grain. This is the type of machine most frequently encountered and the harvester element serves to cut the grain and deliver it toward the feeder housing B. Such a machine is disclosed in our co-pending application Serial No. 511,054, filed November 20, 1943.

Figure 3:
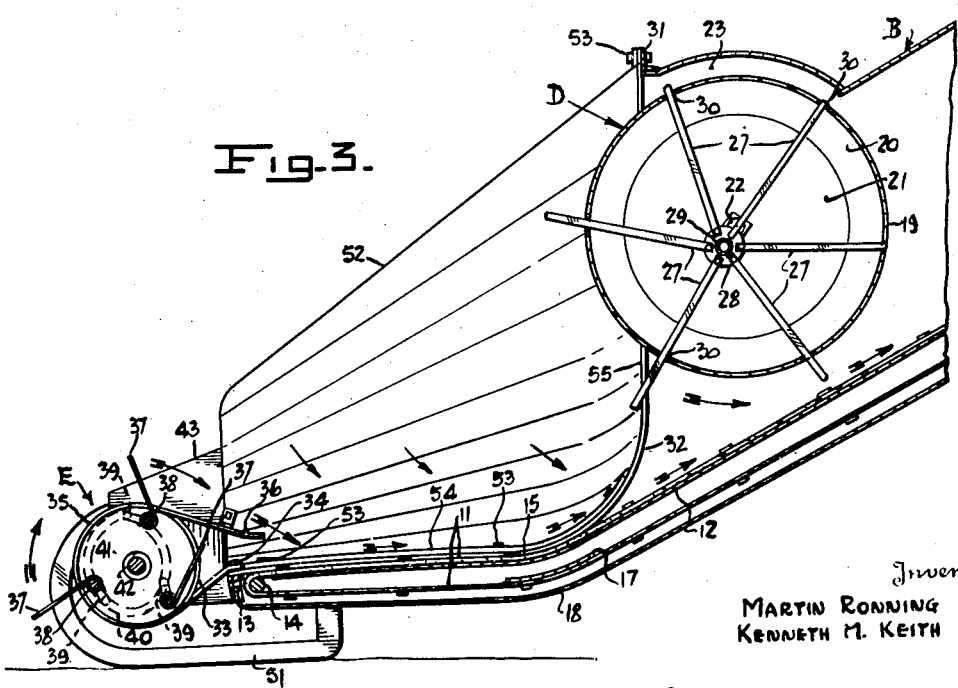
Fig. 3 is an enlarged fragmentary vertical and longitudinal section taken along the line 3—3 in Fig. 1.

A longitudinally extending endless conveyor 11 operates over a rearwardly inclined false bottom 12 of the feeder housing B, to carry the grain up into the thresher part A, and this conveyor also extends at its lower end substantially horizontally forward to a point immediately to the rear of a forward frame bar 13, to which the sickle bar, previously referred to but not here shown, is ordinarily attached. At this point the forward end of conveyor 11 passes around a roller 14, while the rear end passes around a driven roller (not shown) located near the forward end of the thresher A. The upper run of the conveyor 11 is held down in proper position by lateral guide strips 15 secured to the adjacent framing, and the lower run of the conveyor is similarly guided around the turning angle by arcuate guide strips 17 which are spaced between the false bottom 12 of the housing and its true bottom 18. As thus arranged it will be evident that the conveyor 11 will carry the grain upwardly and rearwardly toward the thresher A as indicated by the direction arrows in Figs. 1 and 3.

Journaled for rotation in the forward part of the feeder housing B and spaced above the lower inclined portion of the conveyor 11, is a drum shaped feeder device D. This device comprises a main cylindrical shell 19 terminating in tapered, trunco-conical end caps 20 and having end walls 21 from which trunnions 22 extend, same being journaled in the side walls 23 of the feeder housing B. The trunnion at one end is driven through a sprocket gear and chain mechanism 24 from a countershaft 25 which in turn is conventionally driven from a rear point on the thresher A by a chain and sprocket gear assembly 26. The device D is thus rotated in the direction indicated by the arrow in Fig. 3.

A series of radial arms 27 are provided in the feeder device D and are connected at inner ends to collars 28 rotatably carried upon a crank or eccentric axle 29 supported rigidly within the shell, all of said arms except one set being pivoted to the collars and this set being secured thereto so that as the shell rotates the arms will be carried along, rotating the axle 29. The arms project slidably through openings 30 in the peripheral wall of the shell, and of the caps 20, and as the device D rotates, then, the arms are caused to project outwardly in the form of crop engaging fingers as they move downwardly and rearwardly and will thus engage and feed the grain upwardly on conveyor 11. As the arms start upwardly and then travel forwardly they are progressively retracted into the shell, and thus free the crop permitting it to travel along with the conveyor.

The feeder device D and conveyor 11 thus far described are similar in construction, arrangement and operation to the corresponding parts disclosed in our co-pending application previously identified. In the present invention, however, these parts cooperate with a gathering device forming a novel and effective crop gathering and feeding means as will now be set out in detail.

As previously stated the combine usually has a harvesting part extending laterally from the sides of the conveyor 11 forwardly of the feeder housing B and which is much wider than the housing in order to cut a wide swath in the field. This harvester part includes, as stated, the forward frame bar 13 from which a platform extends rearwardly and then upwardly to a transverse upper frame bar 31, parts of the platform to each side of the conveyor being indicated at 32. The cut grain is, of course, moved along this platform by augers (not shown) toward the conveyor 11 for transfer thereon into the feeder housing.

In accordance with this invention provision is made for conveniently removing end sections of the frame bars 13 and 31 and the platform 32 so that only comparatively short portions thereof remain on the machine to each side of the conveyor, as seen in Fig. 1. The end sections may be arranged for such removal by provision of bolted connections with the remaining ends of the parts in an obvious manner and in making such removal the entire sickle bar assembly is, of course, also removed.

Figure 2:
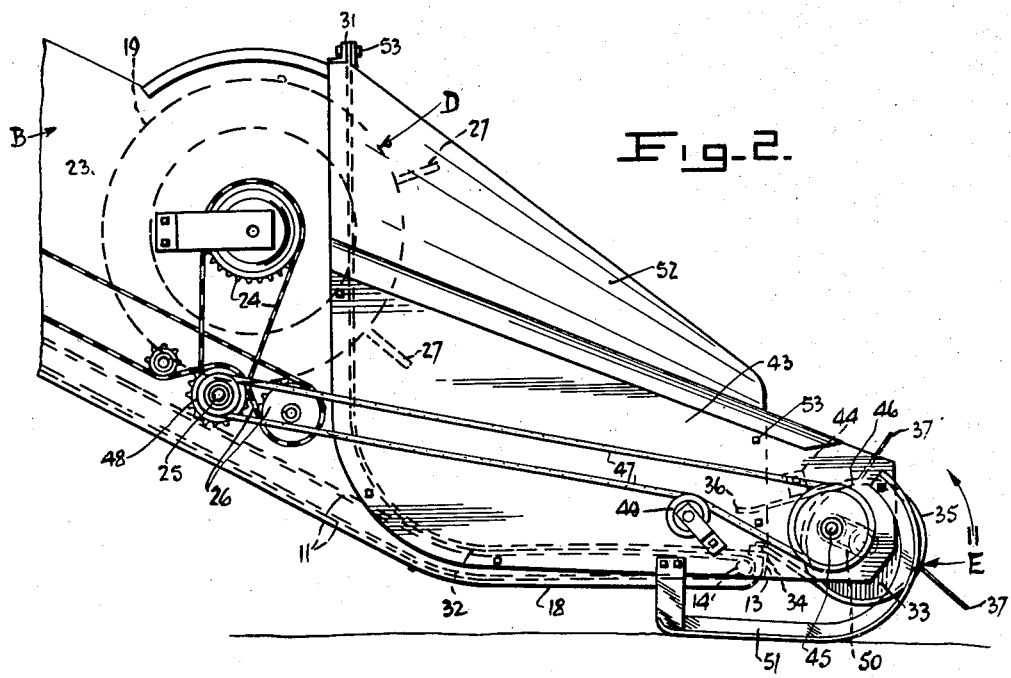
Fig. 2 is an enlarged end view of the forward portion only of the machine, showing our mechanism and its driving means.

A gathering device, designated generally at E, is then substituted for the sickle mechanism and is of such length as to extend the full width of the remaining section of the forward frame bar 13. This device E comprises end support members 33 which are bolted at rear ends at 34 to the frame bar 13 and support a series of stripper bands 35 having rearwardly extending tail portions 36. Between the stripper bands 35 pick-up fingers 37 operate, these fingers being attached at inner ends to crank axles 38 each of which at one end 39 (Fig. 3) operates in a cam groove 40 in the adjacent support member 33. The crank axles 38 are journaled in hubs 41 upon a shaft 42 which is journaled in the support members at its ends. As these hubs are rotated, in the direction indicated by the arrow in Figs. 2 and 3, the fingers 37 are carried around and by action of the cam groove 40 on the crank ends 39 the fingers are caused to extend as they move forwardly and upwardly and gradually to recede as they move rearwardly and downwardly. The tails 36 of the stripper bands will thus strip the crop material, picked up by the fingers as they move upwardly and forwardly, and direct the material rearwardly.

At each side of the short sections of the platform 32 upright support plates 43 are secured and they extend forwardly alongside the ends of the gathering device E. Added support for the latter is then provided by bolting brackets 44 between upper rear portions of the members 33 and the inner sides of the plates 43.

The shaft 42 is driven by a short stub shaft 45 at one end which (Fig. 2) extends through the plate 43 and has a pulley 46 around which is trained a belt 47. The belt 47 runs rearwardly over a pulley 48 on an extended end of the countershaft 25 and the belt is tightened by a conventionally arranged tightener pulley 49. A chain and sprocket mechanism 50 is provided as a connection between the shaft 42 and stub shaft 45 and is arranged within the adjacent end member 33.

Secured to the forward ends of the plates 43 are runners or shoes 51 to hold the gathering device at proper level above the ground in usual manner.

It will be evident that the fingers 37 are carried about in the opposite direction to that of the arms 27 of the feeder device D, but that the movements of both devices D and E are synchronized by virtue of their operation from a common shaft 25. Thus the crop gathering and feeding actions are properly related for the most efficient operation and loading of the conveyor 11.

The gathering device E is considerably wider than either the conveyor 11 or feeder device D and to properly guide the comparatively wide stream of crop material gathered by the device E onto the narrow conveyor and into the housing B we provide at each side of the conveyor a guide member or wing 52. These guide members or wings extend between the rear corners of the gathering device E back to the open forward end of the housing B and converge rearwardly in this plane, as well as slope inwardly from upper to lower edges, as clearly shown. The guide members may be conveniently secured in place by bolts 53 located at several points and will fit at lower edges 54 to or alongside the guide strips 15 for the conveyor, and at rear edges 55 will substantially meet the forward upright edges of the housing B where they merge with the platform sections 32.

In operation as the machine advances over the field along the windrow the fingers 37 of the gathering device E will pick up the crop material and carry it rearwardly. The center part of the gathered crop will fall directly upon the conveyor 11 while the ends of the stream of material will be guided rearwardly and inwardly by the guide members 52 until this material also reaches the conveyor. As the material approaches the forward end of the feeder housing B the arms 27 of the feeder device project and urge the material downwardly and rearwardly so that it is carried evenly and positively upward toward the thresher.

It will be evident that we have thus provided an effective mechanism for gathering and feeding previously cut grain or seed crops to the combine and one which may be applied to the conventional combine by comparatively few and simple alternations thereon.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a combine having a thresher part, an apron conveyor extending forwardly from the thresher part for delivering crop material thereto, a rotary pick-up device disposed at the forward end of the apron for transferring grain lying on the field to the conveyor, a rotary drum feeder disposed over the apron conveyor to cooperate therewith in feeding grain to the thresher part, said drum feeder extending transversely of the apron conveyor with a length substantially equal to the width of the apron conveyor, projectable and retractible arms carried by the drum feeder, and means for rotating the feeder and actuating the arms whereby the arms will be projected while moving rearwardly above the conveyor.

2. In a combine having a thresher part, an apron conveyor extending forwardly from the thresher part for delivering crop material thereto, a rotary pick-up device disposed at the forward end of the apron for transferring grain lying on the field to the conveyor, a rotary drum feeder mounted for rotation about an axis extending transversely of and over the conveyor for cooperation therewith, said feeder having longitudinally spaced series of extensible and retractable crop engaging arms extending therefrom, and means for rotating the drum in a direction that will move the arms, while extended, in the same general feeding direction as that of the conveyor.

3. In a combine having a thresher part, an apron conveyor extending forwardly from the thresher part for delivering crop material thereto, a rotary pick-up device disposed at the forward end of the apron for transferring grain lying on the field to the conveyor, a rotary drum feeder mounted for rotation about an axis extending transversely of and over the conveyor for cooperation therewith, means for rotating the feeder in the same feeding direction as that of the conveyor, said feeder having longitudinally spaced series of crop engaging arms extending therefrom, and means for extending and retracting each series of arms with respect to the drum as the feeder is rotated.

4. In a combine having a thresher, an endless apron extending forwardly from the thresher for delivering crop material thereto, said apron having a substantially horizontal forward portion and an inclined portion extending from the forward portion upwardly toward the thresher, a pick-up mechanism for conveying crop material from the field to the horizontal forward portion of the conveyor, and a rotary feed device disposed transversely over the inclined portion of the conveyor, said pick-up device extending laterally beyond the sides of the conveyor, and means for guiding crop material engaged by end portions of the pick-up device inwardly toward the horizontal portion of the conveyor.

5. In a combine having a thresher, an endless apron extending forwardly from the thresher for delivering crop material thereto, said apron having a substantially horizontal forward portion and an inclined portion extending from the forward portion upwardly toward the thresher, a pick-up mechanism for conveying crop material from the field to the horizontal forward portion of the conveyor, and a rotary feed device disposed transversely over the inclined portion of the conveyor, said pick-up device extending laterally beyond the sides of the conveyor, and means for guiding crop material engaged by end portions of the pick-up device inwardly toward the horizontal portion of the conveyor, said guide means including outwardly and forwardly flared wing plates mounted at the sides of the conveyor and extending to the outer ends of the pick-up device.

6. In a combine having a thresher, a rotary pick-up device disposed forwardly of the thresher, an endless conveyor extending rearwardly from the pick-up device to convey crop material to the thresher, said pick-up device extending laterally beyond both sides of the conveyor, a drum shaped feeder device disposed for rotation about an axis extending transversely of and above the conveyor, said feeder device being of a length substantially corresponding to the width of the conveyor, and means for guiding crop material engaged by end parts of the pick-up device into engagement with the feeder device.

7. In a combine having a thresher, a rotary pick-up device disposed forwardly of the thresher, an endless conveyor extending rearwardly from the pick-up device to convey crop material to the thresher, said pick-up device extending laterally beyond both sides of the conveyor, a drum shaped feeder device disposed for rotation about an axis extending transversely of and above the conveyor, said feeder device having tapered ends, and means for guiding crop material engaged by end parts of the pick-up device into spaces formed between the tapered ends of the feeder drum and side surface parts of the conveyor.

8. In a combine having a thresher, a rotary pick-up device disposed forwardly of the thresher, an endless conveyor extending rearwardly from the pick-up device to convey crop material to the thresher, said pick-up device extending laterally beyond both sides of the conveyor, a drum shaped feeder device disposed for rotation about an axis extending transversely of and above the conveyor, said feeder device having tapered ends, and means for guiding crop material engaged by end parts of the pick-up device into spaces formed between the tapered ends of the feeder drum and side surface parts of the conveyor, said drum having axially spaced series of crop engaging fingers projecting therefrom.

9. In a combine having a harvester part and a thresher part rearwardly thereof, a longitudinal apron conveyor extending forwardly in the harvester part and rearwardly to the thresher part, said harvester part being substantially wider than the conveyor and extending beyond both sides thereof, a rotary feeder disposed over the conveyor and extending substantially thereacross for rotation about a transverse axis, said feeder having projectable and retractable crop engaging fingers disposed at spaced intervals throughout its length, and fixed guide means extending laterally beyond both sides of the conveyor for guiding laterally received material into engagement with the conveyor and feeder.

10. In a combine having a harvester part and a thresher part rearwardly thereof, a longitudinal apron conveyor extending forwardly in the harvester part and rearwardly to the thresher part, said harvester part being substantially wider than the conveyor and extending beyond both sides thereof, a rotary feeder disposed over the conveyor and extending substantially thereacross for rotation about a transverse axis, said feeder having projectable and retractable crop engaging fingers disposed at spaced intervals throughout its length, and fixed guide means extending laterally beyond both sides of the conveyor for guiding laterally received material into engagement with the conveyor and feeder, said rotary feeder including a drum element having tapered outer ends cooperating with side parts of the conveyor to facilitate the movement of the laterally received material onto and up over the conveyor.

MARTIN RONNING.
KENNETH M. KEITH.

REFERENCES CITED

The following references are of record in the file of this patent:

UNITED STATES PATENTS

| Number | Name | Date |
|---|---|---|
| Re. 21,421 | Troyer | Apr. 9, 1940 |
| 1,923,405 | Wickersham | Aug. 22, 1933 |
| 2,112,922 | Millard | Apr. 5, 1938 |
| 2,159,663 | Lindgren | May 23, 1939 |
| 2,302,881 | Oehler | Nov. 24, 1942 |
| 2,327,864 | Brogard et al. | Aug. 24, 1943 |
| 2,328,278 | Innes | Aug. 31, 1943 |
| 2,335,764 | Innes | Nov. 30, 1943 |
| 2,388,212 | McElhoe et al. | Oct. 30, 1945 |